US012483767B2

(12) United States Patent
Jeong et al.

(10) Patent No.: US 12,483,767 B2
(45) Date of Patent: Nov. 25, 2025

(54) VEHICLE VIDEO RECORD SYSTEM, VEHICLE, AND CAMERA MODULE FOR THE SAME

(71) Applicants: Hyundai Motor Company, Seoul (KR); Kia Corporation, Seoul (KR)

(72) Inventors: Dong Hyuk Jeong, Gyeonggi-do (KR); Sung Hwan Jun, Gyeonggi-do (KR); Seok Ju Yeom, Gyeonggi-do (KR); Mun Jun Hur, Gyeonggi-do (KR); Kwan Ho Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/812,407

(22) Filed: Aug. 22, 2024

(65) Prior Publication Data
US 2025/0071399 A1    Feb. 27, 2025

(30) Foreign Application Priority Data
Aug. 23, 2023  (KR) ................. 10-2023-0110613

(51) Int. Cl.
*H04N 23/50* (2023.01)
*B60R 1/24* (2022.01)
*H04N 7/18* (2006.01)

(52) U.S. Cl.
CPC .............. *H04N 23/50* (2023.01); *B60R 1/24* (2022.01); *H04N 7/183* (2013.01); *B60R 2300/30* (2013.01)

(58) Field of Classification Search
CPC .......... H04N 23/50; H04N 7/183; H04N 5/77; H04N 5/907; H04N 7/18; H04N 23/57; B60R 1/24; B60R 2300/30; B60R 2011/0026; B60R 11/04; G03B 11/045; G03B 17/12; G03B 30/00; G07C 5/0866
See application file for complete search history.

(56) References Cited

U.S. PATENT DOCUMENTS

| 11,463,610 | B2* | 10/2022 | Stein ...................... H04N 23/57 |
| 2022/0161738 | A1* | 5/2022 | Jeromin ................... B60R 11/04 |
| 2022/0201189 | A1* | 6/2022 | Kobayashi ............. H04N 23/80 |
| 2023/0326177 | A1* | 10/2023 | Koshisaka ............. H04N 23/71 |
| | | | 382/274 |
| 2024/0163533 | A1* | 5/2024 | McGuire ................. B60R 11/04 |
| 2024/0364985 | A1* | 10/2024 | Suzuki ................... H04N 23/57 |

* cited by examiner

Primary Examiner — Farzana Hossain
(74) Attorney, Agent, or Firm — Fox Rothschild LLP (57) ABSTRACT

A vehicle video record system includes a camera module for monitoring an area around a vehicle, a first memory for storing a video transmitted from the camera module, and a controller including a second memory configured to store a computer program for controlling storage of the video, and a processor configured to execute the computer program, where the camera module includes at least one camera having a view guide extending ahead of the at least one camera to block reflected light coming into a lens of the at least one camera from inside the vehicle, where a vertical field of view of the field of view increases from a center toward both ends along a horizontal expansion of the field of view.

20 Claims, 11 Drawing Sheets

VEHICLE VIDEO RECORD SYSTEM, VEHICLE, AND CAMERA MODULE FOR THE SAME

CROSS-REFERENCE TO RELATED APPLICATION

The present application claims under 35 U.S.C. § 119 (a) the benefit of Korean Patent Application No. 10-2023-0110613, filed on Aug. 23, 2023, the entire contents of which are incorporated herein by reference.

BACKGROUND

(a) Technical Field

The present disclosure relates to a vehicle video record system, a vehicle thereof, and a camera module for the vehicle video record system.

(b) Description of the Related Art

A vehicle video record system, for example, is a device for recording a video of a driving situation of a vehicle.

To this end, the vehicle video record system may include a controller, a memory for storing videos, and a camera for filming videos.

In general, the vehicle video record system stores vehicle driving data at the time together with a video of vehicle surroundings while driving, and records a video according to an already input setting when the generation of a set event is sensed during parking.

The vehicle video record system was initially called a so-called black box and was only installed as an external type, but recently, it has already been built-in to the vehicle before its release.

The built-in type is more advantageous than the external type in that it can access driving data of the host vehicle and may be connected to other controllers, and its use is expected to gradually increase.

Meanwhile, the so-called Augmented Reality (AR) navigation, which implements a navigation function using augmented reality technology while outputting a front video on an Audio Video Navigation Telematics (AVNT) screen, is being used.

When a camera that monitors the front is required for AR navigation, a camera included in the vehicle video record system may be used.

SUMMARY

An embodiment of the present disclosure is to solve a problem that a reflection video such as a dashboard inside a vehicle is included in a video that is captured by a camera module.

Figure 1:
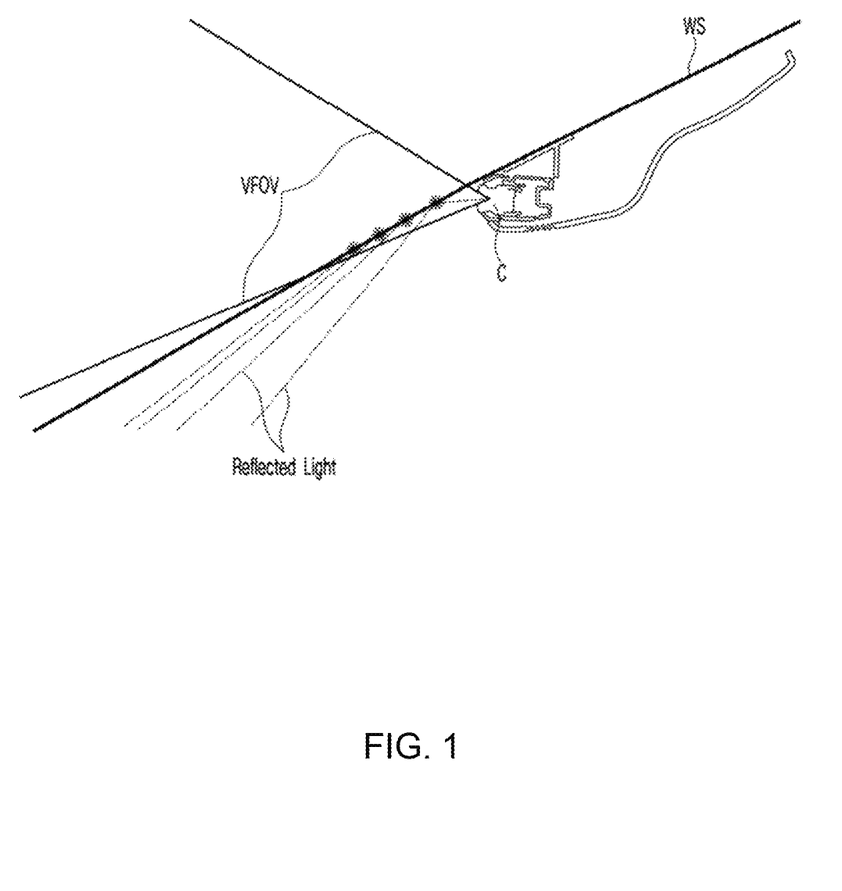
FIG. 1 and FIG. 2 are drawings for explaining a solution to the present disclosure.

That is, as shown in FIG. 1, in the case of a camera fixedly installed inside a window shield of a vehicle, there is a problem in that reflected light from a dashboard or the like is reflected from the window shield and enters the camera to be included in a video.

Since the window shield is inclined and the camera lens is vertically positioned to be distanced from the window shield inside the camera lens, an undesired part of the window shield is included in a field of view, and the reflected light of the dashboard is introduced through the part to include the reflected video.

Figure 2:
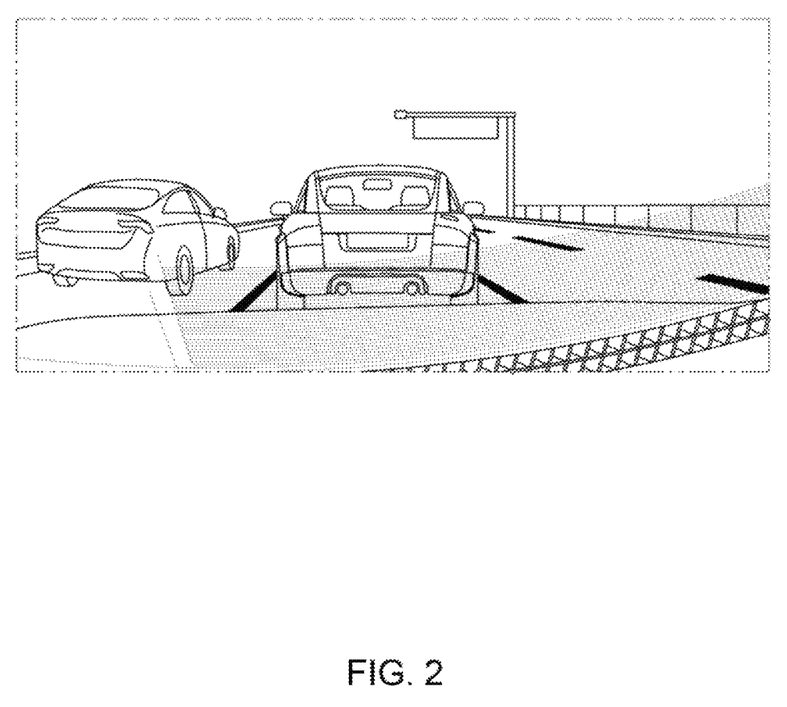
Figure 3:
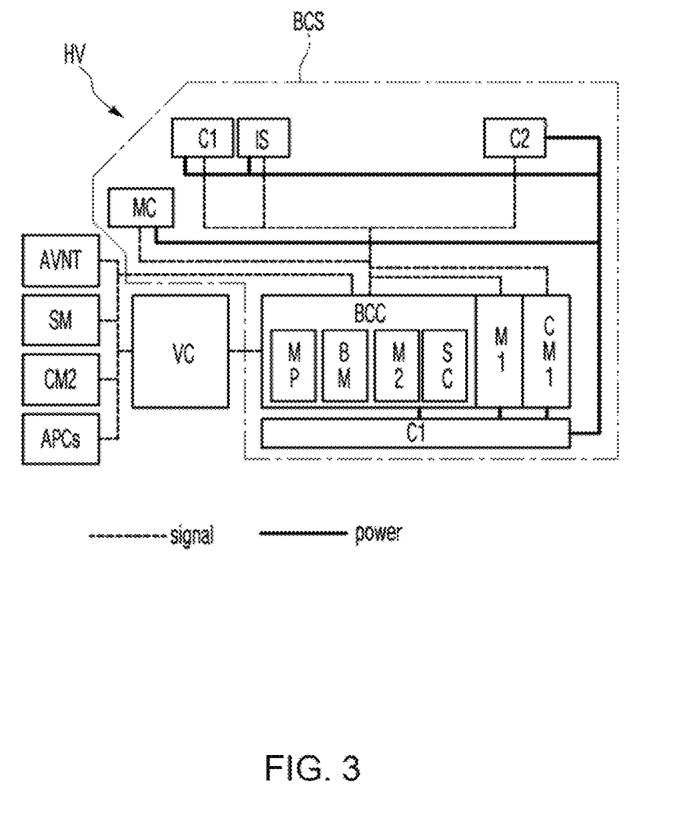
FIG. 3 is a drawing conceptually illustrating a vehicle video record system and components for the vehicle according to an embodiment of the present disclosure.

FIG. 2 is an example in which the reflected video is included, and as illustrated, it can be seen that the reflected video such as a grill shape is included in the lower end part in addition to the video for the front surrounding of the vehicle.

In particular, in the case of the vehicle video record system, since the hood part of the host vehicle should be included in the video together, the vertical angle of view is large, and thus there is a door system in which the influence of reflected light is greater.

In addition, an embodiment of the present disclosure aims to implement AR navigation by minimizing the influence of reflected light by using such camera module.

A vehicle video record system according to an embodiment of the present disclosure comprises a camera module configured to monitor an area around a vehicle, a first memory configured to store a video transmitted from the camera module, and a controller including a second memory configured to store a computer program for controlling storage of the video, and a processor configured to execute the computer program, wherein the camera module includes at least one camera fixed inside of a window shield of the vehicle facing an outside of the vehicle and having a view guide extending ahead of the at least one camera to block reflected light coming into a lens of the at least one camera from inside the vehicle, wherein a vertical field of view of the field of view increases from a center toward both ends along a horizontal expansion of the field of view, and the view guide includes a base view guide comprising a distal end shaped such that the distal end drops downward from a center toward both ends correspondingly to a lower boundary of the field of view.

In at least one embodiment of the present disclosure, a cross section of the lower boundary of the field of view includes an arch shape, and the distal end of the base view guide is curved into an arch shape correspondingly to the arch shape of the lower boundary of the field of view.

In at least one embodiment of the present disclosure, the distal end of the base view guide widens its distance from the window shield toward its both ends In at least one embodiment of the present disclosure, the base view guide extends forward declining, and comprises an upper surface comprising ascending steps toward the at least one camera.

In at least one embodiment of the present disclosure, the view guide further comprises a left view guide extending upward from a left side of the base view guide and a right view guide extending upward from a right side of the base view guide.

In at least one embodiment of the present disclosure, the left view guide and the right view guide are disposed at an interval from the field of view.

In at least one embodiment of the present disclosure, an inner surface from each of the left view guide and the right view guide includes a shape of ascending steps toward the at least one camera.

According to an embodiment of the present disclosure, there is also provided a vehicle comprising a vehicle video record system including a camera module configured to monitor an area around the vehicle, a first memory configured to store a video transmitted from the camera module, a second memory configured to store a computer program for controlling storage of the video, and a controller including a processor configured to execute the computer program, wherein the camera module includes at least one camera fixed inside of a window shield of the vehicle viewing toward an outside and having a view guide extending ahead of the at least one camera to block reflected light coming into a lens of the at least one camera from inside of the vehicle, wherein a vertical field of view of the field of view increases from a center toward both ends along a horizontal expansion of the field of view, and the view guide includes a base view guide comprising a distal end shaped such that the distal end drops downward from a center toward both ends correspondingly to a lower boundary of the field of view.

In a vehicle of at least one embodiment of the present disclosure, a cross section of the lower boundary of the field of view includes an arch shape, and the distal end of the base view guide is curved into the arch shape correspondingly to the arch shape of the lower boundary of the field of view.

In the vehicle according to at least one embodiment of the present disclosure, the distal end of the base view guide widens its distance from the window shield toward its both ends.

In the vehicle of at least one embodiment of the present disclosure, the base view guide extends forward declining, and comprises an upper surface comprising ascending steps toward the at least one camera.

In the vehicle of at least one embodiment of the present disclosure, the view guide further includes a left view guide extending upward from a left side of the base view guide and a right view guide extending upward from a right side of the base view guide.

In the vehicle of at least one embodiment of the present disclosure, the left view guide and the right view guide are disposed at an interval from the field of view.

In the vehicle of at least one embodiment of the present disclosure, an inner surface of each of the left view guide and the right view guide includes an ascending step toward the at least one camera.

In the vehicle of at least one embodiment of the present disclosure, the vehicle further comprises an audio video navigation telematics AVNT configured to display a crop video obtained by cropping out a preset part for the video captured by the camera module on a screen.

In the vehicle of at least one embodiment of the present disclosure, the preset part is determined by an area preset according to an influence of the reflected light.

According to another embodiment of the present disclosure, there is also provided a camera module comprising at least one camera having a field of view including a part of a hood of the vehicle, and a view guide extending ahead of the at least camera to block reflected light entering into the lens of the at least one camera from inside a vehicle, wherein a vertical field of view of the field of view increases from a center toward both ends along a horizontal expansion of the field of view, and the view guide includes a base view guide comprising a distal end shaped such that the distal end drops downward from the center toward both ends correspondingly to a lower boundary of the field of view.

In the camera module according to at least one embodiment of the present disclosure, a cross section of the lower boundary of the field of view includes an arch shape, and the distal end of the base view guide is curved into an arch shape correspondingly to the arch shape of the lower boundary of the field of view.

In the camera module according to at least one embodiment of the present disclosure, the distal end of the base view guide widens its space from the window shield toward its both ends.

In the camera module according to at least one embodiment of the present disclosure, the base view guide extends forward declining, and comprises an upper surface comprises ascending steps toward the at least one camera.

According to an embodiment of the present disclosure, a problem that a reflected video such as a dashboard inside a vehicle is included in a video filmed by a camera module can be minimized.

In addition, according to an embodiment of the present disclosure, AR navigation may be implemented by minimizing the influence of reflected light.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Since the present disclosure is modified in various ways and has various embodiments, specific embodiments will be illustrated and described in the drawings. However, this is not intended to limit the present disclosure to specific embodiments, and it should be understood that the present disclosure includes all modifications, equivalents, and replacements included on the idea and technical scope of the present disclosure.

Terms including ordinals such as "first," "second," and the like may be used to describe various elements, but the elements are not limited by the terms. The terms are used only for the purpose of distinguishing one element from another element.

When an element is "connected" or "linked" to another element, it should be understood that the element may be directly connected or connected to another element, but another element may exist in between.

Unless otherwise defined, all terms used herein, including technical or scientific terms, have the same meaning as that generally understood by those skilled in the art. It will be understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the term "unit" or "control unit" is a term widely used for naming a controller that commands a specific function, and does not mean a generic function unit. For example, each unit or control unit may include a communication device communicating with another controller or sensor, a computer-readable recording medium storing an operating system or a logic command, input/output information, and the like, in order to control a function in charge, and one or more processors performing determination, calculation, determination, and the like necessary for controlling a function in charge.

Meanwhile, the processor includes a semiconductor integrated circuit and/or electronic devices that perform at least one or more of comparison, determination, calculation, and determination in order to achieve a programmed function. For example, the processor may be a computer, a microprocessor, a CPU, an ASIC, and a circuitry (logic circuits), or a combination thereof.

In addition, the computer-readable recording medium (or simply referred to as a memory) includes all types of storage devices in which data that can be read by a computer system is stored. For example, the memory may include at least one type of a flash memory of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The recording medium is electrically connected to the processor, and the processor retrieves and records data from the recording medium. The recording medium and the processor either may be integrated or may be physically separated.

Hereinafter, the embodiments of the present disclosure will be described in detail with reference to the accompanying drawings.

Referring to FIG. 1, the so-called built-in camera system (BCS; shortly referred to as a "built-in cam", hereinafter), which is an embedded driving video record device according to an embodiment of the present disclosure, is embedded in a host vehicle HV and includes camera modules C, a computer-readable storage medium M1, a first communication module CM1, a microphone MC, an impact sensor IS, an auxiliary power battery BT, and a built-in cam controller BCC.

Although the video record system of the present embodiment is described herein as a built-in type, it is not limited thereto.

First, the camera module C includes a front camera C1 and a rear camera C2 in the present embodiment, but is not limited thereto. The front camera C1 is installed to capture a video of a front region of the vehicle HV, and the rear camera C2 is installed to capture a video of a rear region of the vehicle HV.

For example, the front camera may be installed at a position near the room mirror in the vehicle (HV) cabin of the window shield, and the rear camera may be installed at the rear window of the vehicle (HV) cabin or the rear bumper. Also, the left and right cameras, respectively, may be installed on a side mirror, on a front or rear fender, or on a bumper.

For example, the front camera C1 and the rear camera C2 have the video quality of either an HD, an FHD, or a Quad HD.

It is evident that the front camera and the rear camera do not need to have the same video quality, and a camera of an Advanced Drive Assistance System ADAS system of the host vehicle HV may be used.

Further, the camera has an aperture value of F2.0 or less, preferably F1.6 or less. If the aperture value decreases, more light is gathered so that recording may be made brighter. In addition, by applying image tuning technology to minimize the noise and the loss of light, clear recording is possible even in a dark environment.

The computer-readable recording medium M1 (hereinafter, called "memory", in short) includes all types of storage devices in which data that can be read by a computer system is stored. For example, the memory includes at least a memory type of a flash memory, of a hard disk, of a microchip, of a card (e.g., a Secure Digital (SD) card or an eXtream Digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

In this embodiment, the memory M1 is 64 Gbyte or more Micro SD, and is of an external type. For example, real-time recording when traveling (hereinafter, simply referred to as an "driving real-time recording") may be performed for several hours, and a real-time recording when parking (hereinafter, simply referred to as an "parking real-time recording") may be performed for several tens of hours. In addition, event record according to impact detection may be performed up to several tens of times. The event record may include record according to impact occurrence when traveling (hereinafter, referred to as "driving impact recording") and record according to impact occurrence when parking (hereinafter, referred to as "parking impact recording"). Here, whether the current mode is in the driving mode or the parking mode may be determined, when the vehicle start switch is "IGN ON" (ignition on) for a driving mode, and when the vehicle start switch is not "ON" for a parking mode.

The user can easily check the contents stored in the memory in a desktop computer or the like by extracting the SD card.

The information of the state of the SD card can be checked through the connected car service, and the time of replacement according to the memory state can also be checked.

The first communication module CM1 is for wired or wireless communication with the exterior and is not limited to communication protocol.

In the present embodiment, the first communication module CM1 includes a communication device capable of directly communicating with nearby devices, and illustratively supports Wi-Fi. The Wi-Fi module of the present embodiment may include an Access Point (AP) function, and a user may easily and quickly access the built-in cam through, for example, a smartphone.

Due to Wi-Fi, the user can easily and quickly access the built-in cam through, for example, a smartphone.

The microphone MC supports voice recording. When the driving videos of the vehicle HV is recorded, not only the videos are recorded but also the voices are recorded as well.

The impact sensor IS senses an external impact and may be a one-axis or a three-axis acceleration sensor.

The impact sensor IS may be prepared as the built-in cam system BCS, but it is evident that it may be used as an acceleration sensor installed in the host vehicle HV.

The signals of the impact sensor IS may be a starting points for a later described event recording, and the degree of impact serving as a references thereof can be set by the user.

For example, the user may select an impact detection sensitivity that is a reference for event record when setting up the built-in cam system BCS through a display screen (e.g., a later described AVNT screen) in the vehicle HV.

For example, the impact sensitivity may be classified into five levels: the first level (highly unresponsive), the second level (unresponsive), the third level (normal sensitivity), the fourth level (sensitive), and the fifth level (highly sensitive).

The built-in cam system BCS receives power from a battery (e.g., a 12V battery) installed in the vehicle HV.

Although the system is operated by receiving power of the vehicle HV battery during parking as well as during driving, there may be an over-discharge problem of the vehicle HV battery, and thus, the present embodiment includes the power auxiliary battery BT.

In the present embodiment, the built-in cam system BCS receives power from any one of the battery of the vehicle HV, of the alternator in the case of the internal combustion engine vehicle, and of the lower DC/DC converter in the case of the electric vehicle, while receiving power from the power auxiliary battery BT during parking. However, it is not limited thereto.

The power auxiliary battery BT is charged and discharged depending on an operating environment of the vehicle HV and supplies optimal power for recording and OTA software update during parking.

The charging of the power auxiliary battery BT is performed by a vehicle HV battery (a low voltage battery or a high voltage battery of an electric vehicle), or performed by an alternator in the case of an internal combustion engine vehicle HV.

The built-in cam controller BCC is an upper level controller that controls other components of the built-in cam BCS and exchanges signals with the controller VC of the host vehicle HV and/or the second communication module (vehicle communication module), the sensor module SM, the component controllers APCs, the AVNT, and the like. For example, local interconnect network (LIN) or controller area network (CAN) communication may be used for such signal exchange.

Here, the sensor module SM may include one or more of a speed sensor, an acceleration sensor, a vehicle position sensor (e.g., a GPS receiver), a steering angle sensor, a yaw rate sensor, a pitch sensor, and a roll sensor, and the component controllers APCs may include one or more of a turn signal controller, a turn signal controller, a wiper controller, an ADAS system controller, and an airbag controller.

The built-in cam controller (BCC) controls other components to perform recording at all times during driving, recording at all times during parking, recording events to be recorded according to the impact signal of the impact sensor, and the like.

When recording, driving information of the vehicle HV is recorded as well.

Here, the vehicle (HV) driving information includes time, vehicle speed, gear position, turn signal information, impact detection sensitivity (one corresponding to the above-described five levels), global positioning system GPS position information, etc.

The vehicle driving information may be received from the vehicle controller VC, but may also be directly received from a corresponding module or component of the vehicle amount HV. For example, a vehicle speed may be directly received from a speed sensor of the vehicle HV, turn signal information (or turn signal information from a turn signal controller) may be directly received from a turn signal controller, and GPS location information may be received from a AVNT or a GPS receiver.

As described above, the event recording is performed when the event occurrence is detected while parking depending on the impact detection sensitivity set by the user.

In the event recording, recording is performed from a set time before the event occurrence time to a set time after the event occurrence time, and the set time may be selected by the user.

The AVNT is connected to the built-in cam controller BCC through the vehicle controller VC or directly, and the AVNT screen may function as a user interface for receiving various setting parameters of the built-in cam system BCS from the user.

The built-in cam controller BCC transmits recorded content to an external server according to a set period, a user selection, or an event (e.g., a degree of impact detection) from a user setting.

The built-in cam controller BCC includes a memory M2 and a processor MP to perform its functions.

In an embodiment, the processor MP may include a semiconductor integrated circuit and/or electronic devices that perform at least one or more of comparison, determination, calculation, and determination to achieve a programmed function. For example, the processor MP may be a computer, a microprocessor MC, a CPU, an ASIC, and electronic circuits (circuitry, logic circuits), or a combination thereof.

The memory M2 may be any type of storage device that stores data that can be read by a computer system, and may include, for example, at least one of a flash memory type, a hard disk type, a micro type, a card type (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

Operating software of the BCC is stored in the memory M2, and the processor MP reads and executes the corresponding software to perform the function of the BCC.

In addition, the built-in cam controller BCC includes a buffer memory BM for determination, calculation, and the like in the processor MP.

Also, the built-in cam controller BCC includes a super capacitor SC. The super capacitor SC is charged when power is applied to the built-in cam controller BCC When power is suddenly cut off due to impact, damage, or the like, power charged in the super capacitor SC is used to complete video storage that is in progress.

For example, the super capacitor SC have a charging capacity capable of maintaining the power of the built-in cam controller BCC from several to tens of seconds.

Hereinafter, the front camera C1 and the view guide VG for minimizing the reflected video will be described in detail.

First, the front camera C1 is fixedly installed from the inside of the window shield WS toward the outside.

Figure 4A:
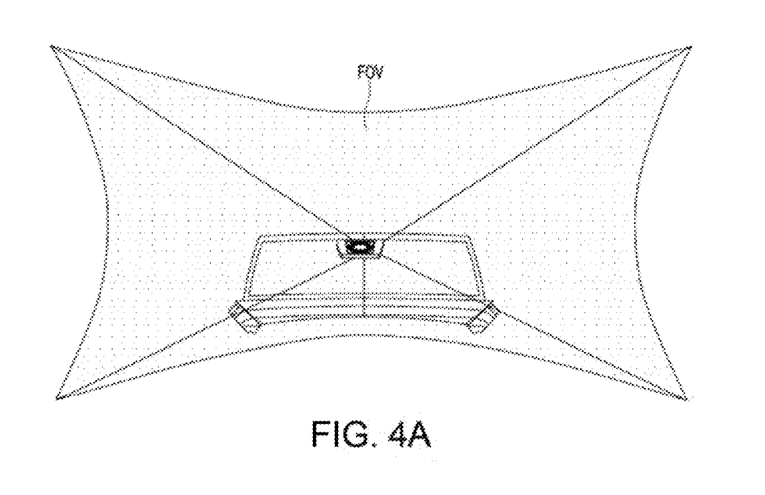
FIGS. 4A and 4B illustrate a field of view of a camera in an embodiment of the present disclosure.
Figure 4B:
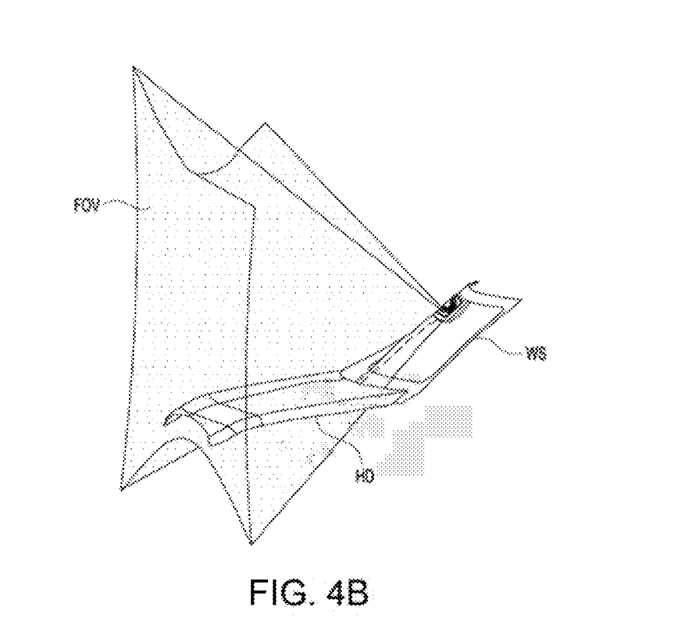

The field of view FOV of the front camera C1 has a range in which a part of the vehicle hood HD is included, as shown in FIGS. 4A and 4B. This is because even the vehicle body hood HD in front of the vehicle must be included in the video in order to see a clear situation when an accident occurs in front of the vehicle.

The FOV of the front camera C1 of the present embodiment, as shown in FIGS. 4A and 4B, has a greater vertical range from the center to both ends. That is, the front camera C1 has a greater vertical field of view VFOV from the center to both ends.

Since the front camera C1 of the present embodiment has a large vertical field of view VFOV to include the vehicle hood HD, the front camera C1 may be more widely affected by the reflected light of the dashboard.

Figure 5A:
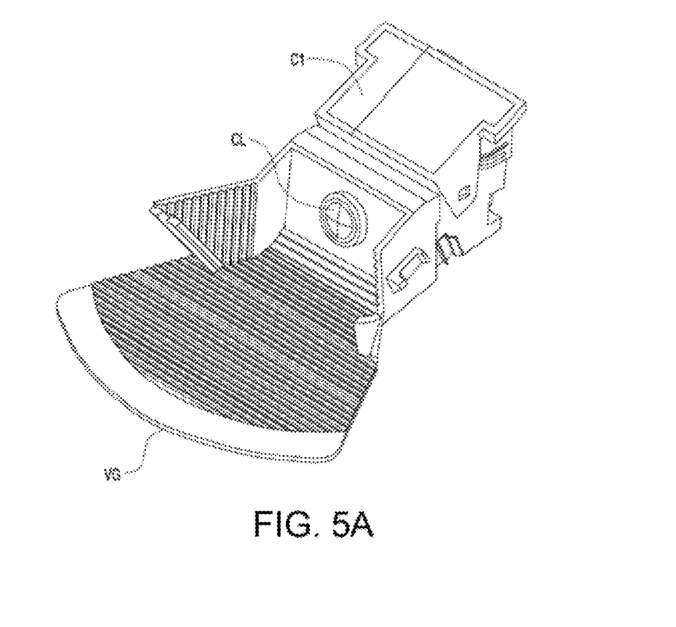
FIGS. 5A and 5B illustrate a comparative example of a view guide for blocking reflected light.
Figure 5B:
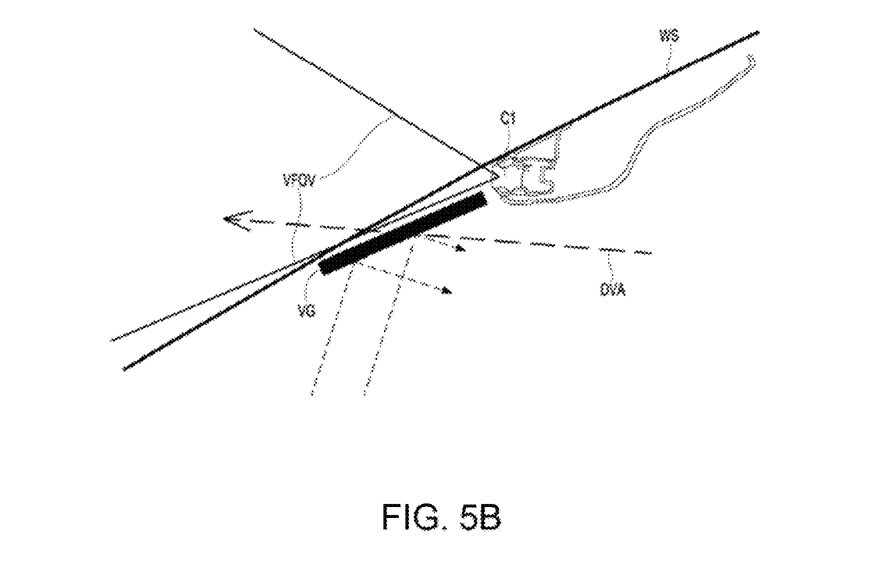

In order to block such as shown in FIGS. 5A and 5B, the view guide VG that is inclined downward toward the window shield WS from the lower part of the camera lens CL and extends long may be considered.

As shown in FIGS. 5A and 5B, the view guide VG may effectively block the reflected light of the dashboard, but there is an issue of covering the driver viewing angle DVA.

In addition, since minimizing the inclusion of the view guide VG in the video is required, it is recommended to minimize an interference of the FOV height.

Therefore, the view guide VG is recommend to have a structure that does not have the driver viewing angle DVA, minimizes interference with the field of view FOV of the front camera C1, and effectively blocks the reflected light of the dashboard.

Figure 6:
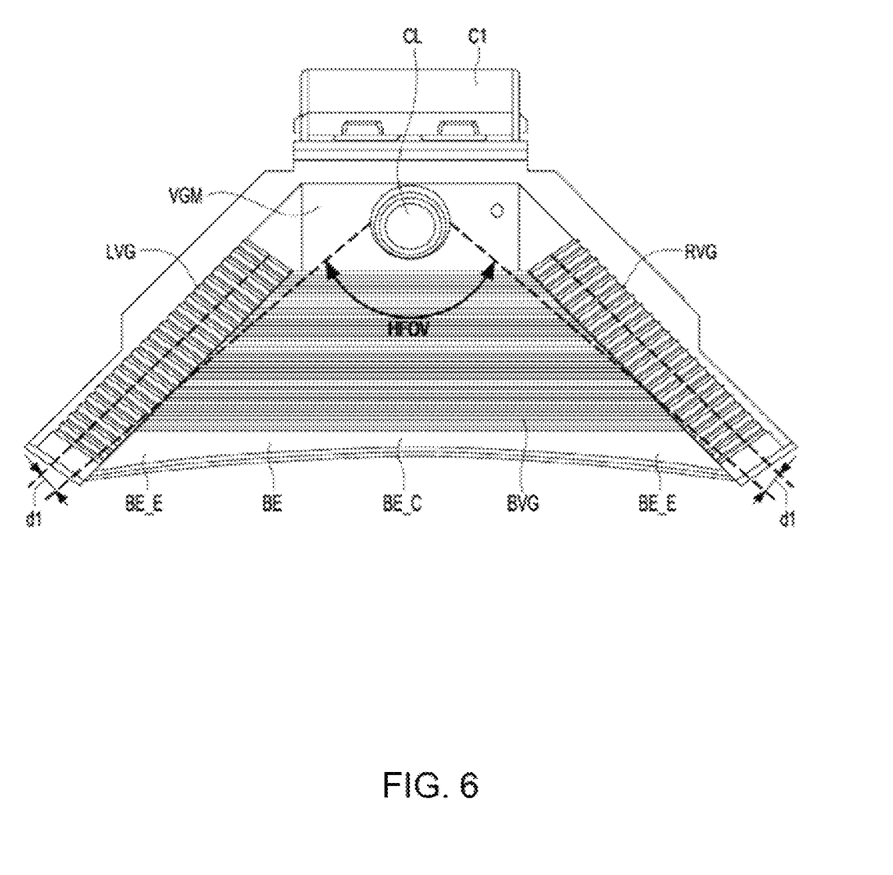
FIG. 6 shows a camera module according to an embodiment of the present disclosure.

FIG. 6 illustrates a front camera C1 and a view guide VG according to an embodiment of the present disclosure, which will be described in detail.

The view guide VG of FIG. 6 includes a mounting part VGM, a base view guide BVG, and a left view guide LVG and a right view guide RVG extending upward from both sides thereof.

The view guide VG of FIG. 6 is integrally formed through plastic injection.

The mounting part VGM is coupled to the circumference of a barrel of the camera lens CL to support the base view guide BVG, the left view guide LVG, and the right view guide RVG.

Figure 8A:
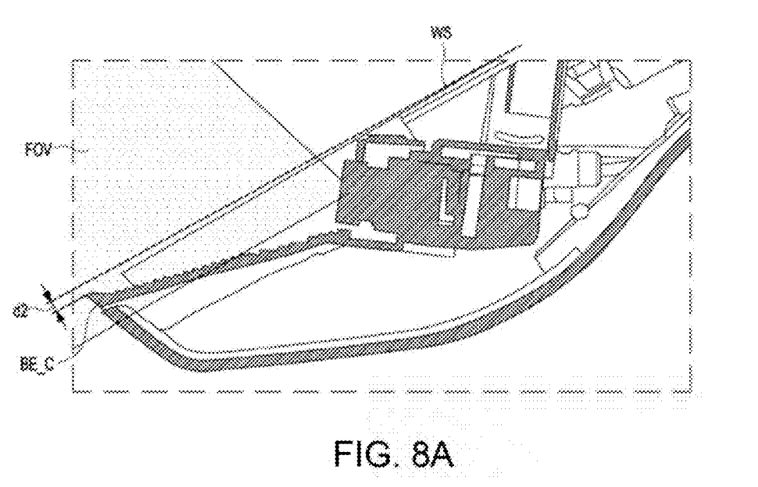
FIGS. 8A and 8B illustrate a central cross-sectional view and a cross-sectional view seen from one end in a state in which the camera module of FIG. 6 is installed inside a window shield.
Figure 8B:
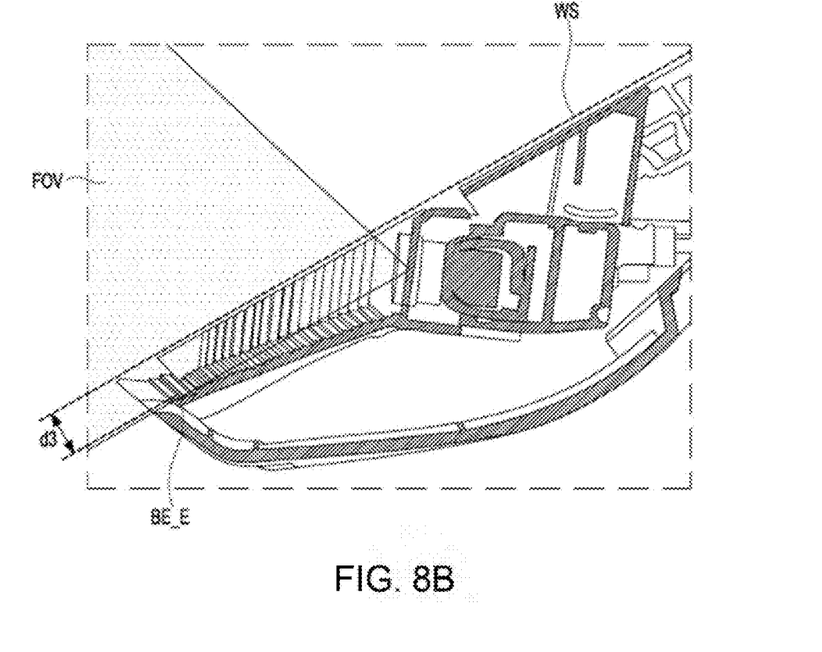

The base view guide BVG has a fan shape in the plane view and is inclined downward so as not to interfere with the field of view FOV of the front camera C1 and is formed to extend (see FIG. 8).

Further, as shown in FIG. 6, the left view guide LVG and the right view guide RVG are disposed to be distanced apart from the field of view FOV at a predetermined interval d1 so as not to interfere with both boundaries of the horizontal field of view HFOV.

Figure 7:
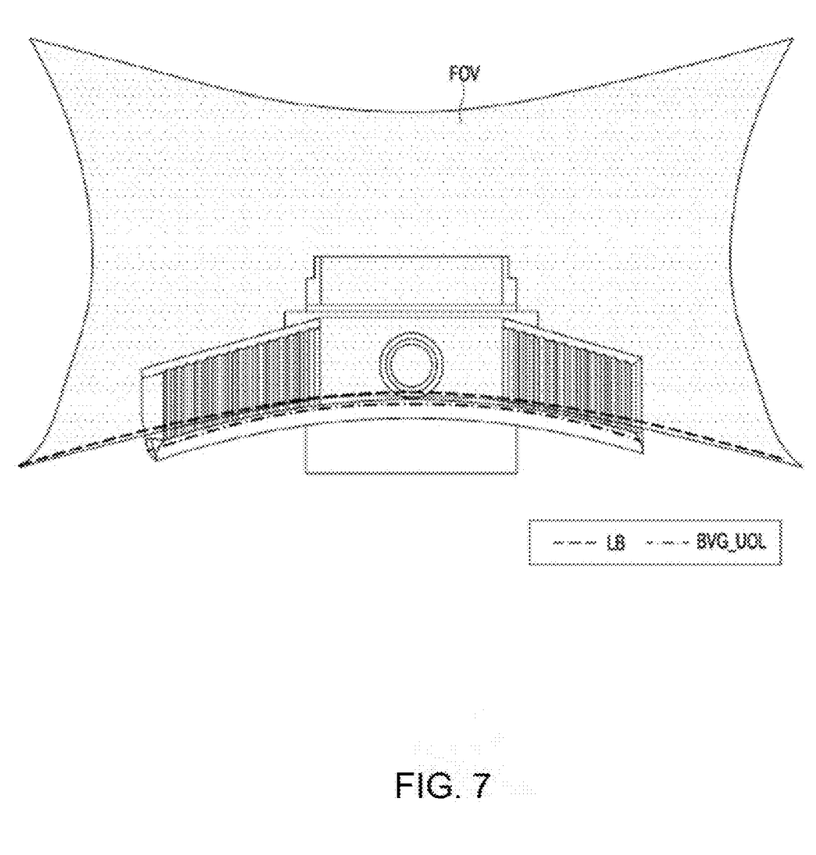
FIG. 7 is a view illustrating a front view of the camera module of FIG. 6 together with a field of view.

FIG. 7 shows a front view of the front camera C1 together with a vertical cross section of the field of view FOV at the end BE of the base view guide BVG, and as shown in FIG. 7, a lower boundary LB of the field of view FOV has an arch shape.

As shown in FIG. 7, the end BE of the base view guide BVG is curved into the arch shape corresponding to the arch shape of the lower boundary LB at a position distanced apart from the lower boundary LB of the field of view FOV. The base view guide BVG may have such an arch shape as a whole as well as the end BE.

As shown in FIGS. 8A and 8B, the end BE of the base view guide BVG extends upward toward the window shield WS, and a distance d2 from the window shield WS at the center BE_C is smaller than a distance d3 from the window shield WS at both ends BE_E.

The closer the end BE of the base view guide BVG is to the window shield WS, the more effective it is to block reflected light.

However, in this case, air circulation is not good, and fogging problems may occur.

Therefore, the distance d3 from the window shield WS at both ends BE_E of the end BE of the base view guide BVG may be greater than the distance d3 from the center BE_C, thereby securing air permeability.

Figure 9A:
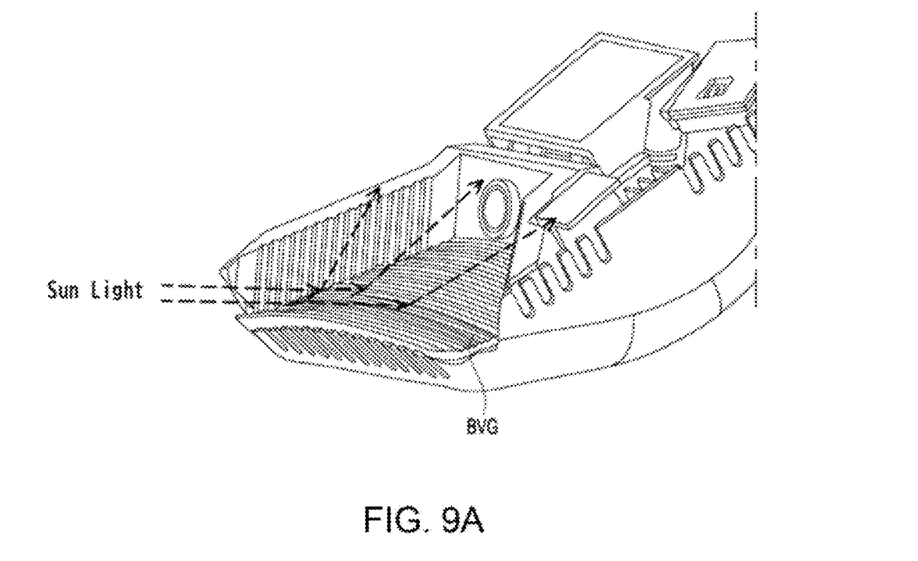
FIGS. 9A and 9B illustrate a solar light incident of the camera module of FIG. 6.
Figure 9B:
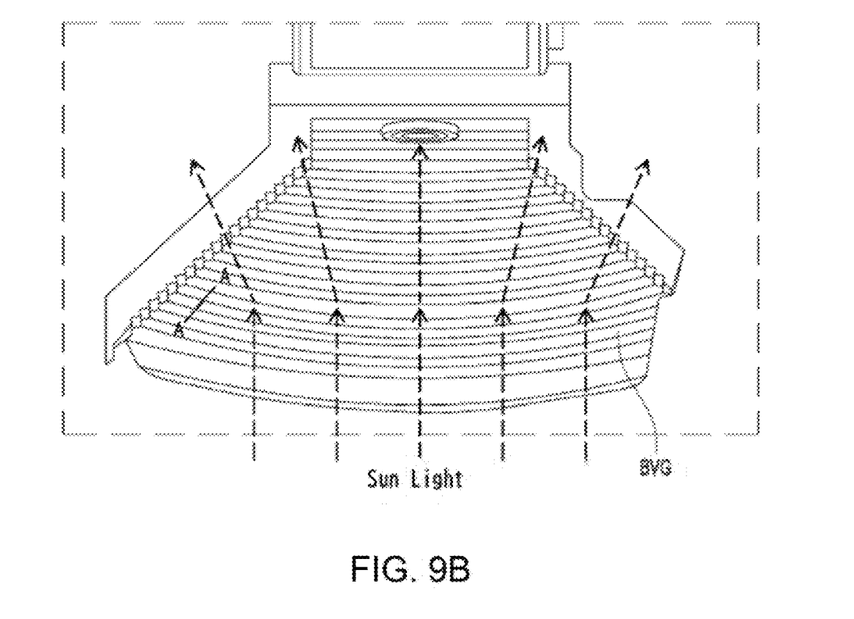
Figure 10:
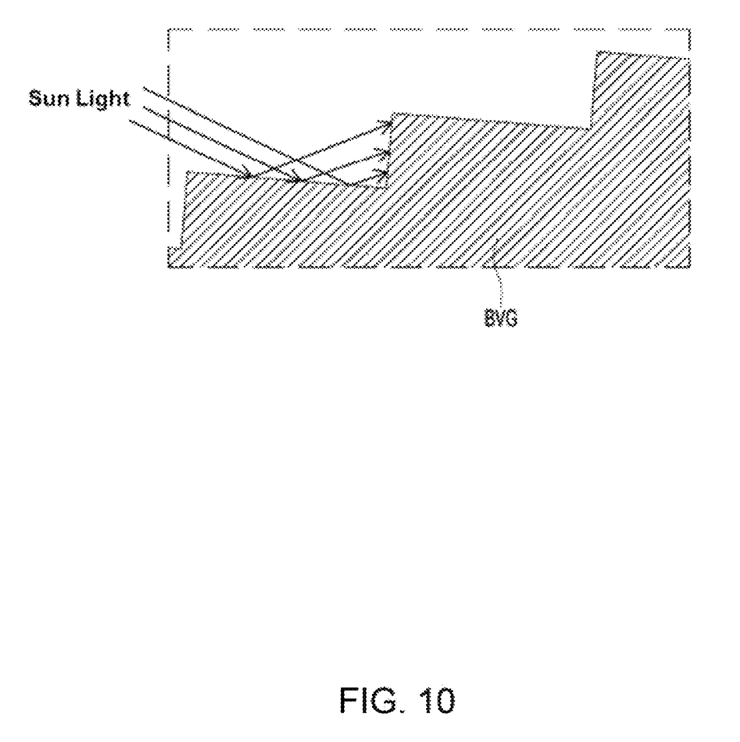
FIG. 10 is a cross-sectional view taken along line A-A of FIG. 9.

In addition, as shown in FIGS. 9A and 9B and FIG. 10, the base view guide BVG includes an ascending step shape toward the front camera C1 on an upper surface thereof.

That is, referring to FIG. 10 showing a cross-section A-A of FIG. 9B, since the upper surface is formed in a step shape, direct sunlight is prevented from being reflected from the upper surface of the base view guide BVG and entering the camera lens CL.

In addition, as shown in FIGS. 9A and 9B, the base view guide BVG has an arch shape, and thus the entering of sunlight to the camera lens CL is minimized.

In addition, as shown in FIGS. 9A and 9B, the above-described ascending step is applied to the inner surface of the left view guide LVG and the right view guide RVG, thereby achieving the same effect.

Figure 11:
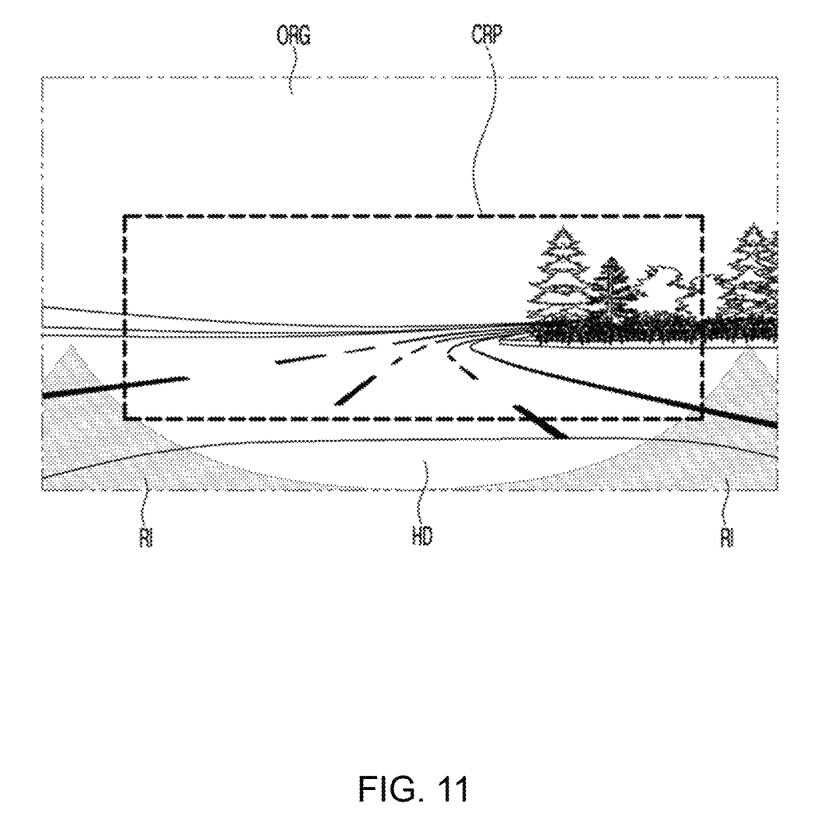
FIG. 11 illustrates a crop area for AR navigation of a video captured by the camera module of FIG. 6.

FIG. 11 shows a front video ORG filmed by the built-in cam according to the present embodiment.

As shown in FIG. 11, it shows that the influence of the reflected video of the dashboard in the lower part of the video ORG, particularly in the central part, is very small.

This is due to the lower left and right reflected image RI of the video ORG of FIG. 11 does not block some reflected light from the side because both ends BE_E of the base view guide BVG are further distanced apart from the window shield WS.

Meanwhile, in the vehicle according to an embodiment of the present disclosure, the video of the front camera C1 of the built-in cam is used as the video output on the AVNT.

In this case, as shown in FIG. 11, a cropped part CRP obtained by cropping a set part in the original video ORG of the front camera C1 is output to the AVNT screen, thereby implementing AR navigation.

Here, as shown in FIG. 11, the set part as the cropped part CRP is determined as a part in which the influence of the reflected video is minimized.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A vehicle video record system comprising:
    a camera module configured to monitor an area around a vehicle;
    a first memory configured to store a video transmitted from the camera module; and
    a controller including a second memory configured to store a computer program for controlling storage of the video, and a processor configured to execute the computer program,
    wherein the camera module includes at least one camera fixed inside of a window shield of the vehicle facing an outside of the vehicle and comprising a view guide extending ahead of the at least one camera to block reflected light coming into a lens of the at least one camera from inside the vehicle,
    wherein a vertical field of view of the field of view increases from a center toward both ends along a horizontal expansion of the field of view, and the view guide includes a base view guide comprising a distal end shaped such that the distal end drops downward from a center toward both ends correspondingly to a lower boundary of the field of view.

2. The vehicle video record system of claim 1, wherein a cross section of the lower boundary of the field of view includes an arch shape, and the distal end of the base view guide is curved into an arch shape correspondingly to the arch shape of the lower boundary of the field of view.

3. The vehicle video record system of claim 1, wherein the distal end of the base view guide widens its distance from the window shield toward its both ends.

4. The vehicle video record system of claim 1, wherein the base view guide extends forward, and comprises an upper surface comprising ascending steps toward the at least one camera.

5. The vehicle video record system of claim 1, wherein the view guide further comprises a left view guide extending upward from a left side of the base view guide and a right view guide extending upward from a right side of the base view guide.

6. The vehicle video record system of claim 5, wherein the left view guide and the right view guide are disposed at an interval from the field of view.

7. The vehicle video record system of claim 5, wherein an inner surface from each of the left view guide and the right view guide includes a shape of ascending steps toward the at least one camera.

8. A vehicle comprising:
    a vehicle video record system including a camera module configured to monitor an area around the vehicle;
    a first memory configured to store a video transmitted from the camera module;
    a second memory configured to store a computer program for controlling storage of the video, and
    a controller including a processor configured to execute the computer program,
    wherein the camera module includes at least one camera fixed inside of a window shield of the vehicle facing an outside of the vehicle and having a view guide extending ahead of the at least one camera to block reflected light coming into a lens of the at least one camera from inside of the vehicle,
    wherein a vertical field of view of the field of view increases from a center toward both ends along a horizontal expansion of the field of view, and the view guide includes a base view guide comprising a distal end shaped such that the distal end drops downward from a center toward both ends correspondingly to a lower boundary of the field of view.

9. The vehicle of claim 8, wherein a cross section of the lower boundary of the field of view includes an arch shape, and the distal end of the base view guide is curved into the arch shape correspondingly to the arch shape of the lower boundary of the field of view.

10. The vehicle according to claim 8, wherein the distal end of the base view guide widens its distance from the window shield toward its both ends.

11. The vehicle of claim 8, wherein the base view guide extends forward, and comprises an upper surface comprising ascending steps toward the at least one camera.

12. The vehicle according to claim 8, wherein the view guide further includes a left view guide extending upward from a left side of the base view guide and a right view guide extending upward from a right side of the base view guide.

13. The vehicle according to claim 12, wherein the left view guide and the right view guide are disposed at an interval from the field of view.

14. The vehicle of claim 12, wherein an inner surface of each of the left view guide and the right view guide includes an ascending step toward the at least one camera.

15. The vehicle according to claim 8, further comprises an audio video navigation telematics (AVNT) configured to display a crop video obtained by cropping out a preset part for the video captured by the camera module on a screen.

16. The vehicle of claim 15, wherein the preset part is determined by an area preset according to an influence of the reflected light.

17. A camera module, comprising:
    at least one camera having a field of view including a part of a hood of the vehicle; and
    a view guide extending ahead of the at least camera to block reflected light entering into the lens of the at least one camera from inside a vehicle,
    wherein a vertical field of view of the field of view increases from a center toward both ends along a horizontal expansion of the field of view, and the view guide includes a base view guide comprising a distal end shaped such that the distal end drops downward from the center toward both ends correspondingly to a lower boundary of the field of view.

18. The camera module of claim 17, wherein a cross section of the lower boundary of the field of view includes an arch shape, and the distal end of the base view guide is curved into an arch shape correspondingly to the arch shape of the lower boundary of the field of view.

19. The camera module of claim 17, wherein the distal end of the base view guide widens its space from the window shield toward its both ends.

20. The camera module of claim 17, wherein the base view guide extends forward declining, and comprises an upper surface comprises ascending steps toward the at least one camera.

* * * * *